(12) United States Patent
Reist et al.

(10) Patent No.: US 11,061,411 B2
(45) Date of Patent: Jul. 13, 2021

(54) AUTOMATIC ARMING OF AIRCRAFT STEEP APPROACH FUNCTION

(71) Applicant: BOMBARDIER INC., Dorval (CA)

(72) Inventors: David Reist, Chute a Blondeau (CA); Alain Moisan, Kirkland (CA)

(73) Assignee: BOMBARDIER INC., Dorval (CA)

( * ) Notice: Subject to any disclaimer, the term of this patent is extended or adjusted under 35 U.S.C. 154(b) by 176 days.

(21) Appl. No.: 16/331,205

(22) PCT Filed: Aug. 31, 2017

(86) PCT No.: PCT/IB2017/055244
§ 371 (c)(1),
(2) Date: Mar. 7, 2019

(87) PCT Pub. No.: WO2018/047042
PCT Pub. Date: Mar. 15, 2018

(65) Prior Publication Data
US 2019/0278299 A1  Sep. 12, 2019

Related U.S. Application Data

(60) Provisional application No. 62/385,421, filed on Sep. 9, 2016.

(51) Int. Cl.
| | |
|---|---|
| *G05D 1/06* | (2006.01) |
| *G05D 1/00* | (2006.01) |
| *G08G 5/02* | (2006.01) |
| *G08G 5/00* | (2006.01) |

(52) U.S. Cl.
CPC ......... *G05D 1/0676* (2013.01); *G05D 1/0088* (2013.01); *G08G 5/0013* (2013.01); *G08G 5/0021* (2013.01); *G08G 5/025* (2013.01)

(58) Field of Classification Search
CPC .. G05D 1/0676; G05D 1/0088; G08G 5/0013; G08G 5/0021; G08G 5/025
See application file for complete search history.

(56) References Cited

U.S. PATENT DOCUMENTS

| | | |
|---|---|---|
| 3,627,238 A | 12/1971 | Menn |
| 8,489,261 B2 | 7/2013 | Albert et al. |
| 9,280,904 B2 | 3/2016 | Bourret et al. |
| 9,547,312 B2 * | 1/2017 | Buisson ................. G08G 5/025 |
| 2004/0167685 A1 | 8/2004 | Ryan et al. |
| 2007/0010921 A1 | 1/2007 | Ishihara et al. |
| 2014/0249704 A1 * | 9/2014 | De Tarso Ferreira ... G08G 5/02 701/18 |
| 2014/0350755 A1 | 11/2014 | Caillaud et al. |
| 2016/0288922 A1 * | 10/2016 | He ......................... B64D 45/08 |

FOREIGN PATENT DOCUMENTS

EP    2328053 A1    6/2011

OTHER PUBLICATIONS

PCT international Search Report and Written Opinion dated Nov. 20, 2017 re: International Application No. PCT/IB2017/055244.

* cited by examiner

*Primary Examiner* — Marthe Y Marc-Coleman
(74) *Attorney, Agent, or Firm* — Norton Rose Fulbright Canada LLP

(57) ABSTRACT

Systems and methods for automatically arming a steep approach function of an aircraft are disclosed. One exemplary method comprises automatically initiating arming of the steep approach function of the aircraft based on data (e.g., glide slope angle) associated with the approach procedure to be performed by the aircraft.

23 Claims, 3 Drawing Sheets

AUTOMATIC ARMING OF AIRCRAFT STEEP APPROACH FUNCTION

CROSS-REFERENCE TO RELATED APPLICATION(S)

This application is a national phase application under 35 U.S.C. 371 of International Patent Application No. PCT/IB2017/055244 filed on Aug. 31, 2017, which claims priority from U.S. Provisional Patent Application No. 62/385,421 filed on Sep. 9, 2016, the entire contents of which are hereby incorporated by reference.

TECHNICAL FIELD

The disclosure relates generally to alleviating pilot workload during the operation of aircraft, and more particularly to systems and methods for automatically arming a steep approach function of an aircraft.

BACKGROUND OF THE ART

Pilots have many tasks to perform and their workload can vary even during routine flights due to weather conditions and aircraft systems states. Descent, approach and landing phases of flight of an aircraft can be periods of relatively high workload for pilots and can be even more so for steep approaches.

Classic (non-steep) approach angles are typically in the order of about 3 degrees. However, certain airports located in urban areas can impose approach procedures that require steeper approach angles for noise reduction. Steeper approach angles can also be required for landing at airports located near mountainous terrain. Steep approach procedures can be different from approaches carried out at classic angles and can impose a higher workload on the pilots.

SUMMARY

In one aspect, the disclosure describes a flight management system for an aircraft. The flight management system comprises:
one or more data processors; and
non-transitory machine-readable memory storing a navigation database including data associated with an approach procedure to be performed by the aircraft, and, instructions executable by the one or more data processors and configured to cause the one or more data processors to:
conditioned upon the data associated with the approach procedure to be performed by the aircraft being indicative of a steep approach, automatically generate a request to arm a steep approach function of the aircraft.

The data associated with the approach procedure to be performed by the aircraft may comprise a glide slope angle.

The instructions may be configured to cause the one or more data processors to determine whether the glide slope angle is indicative of the steep approach by comparing the glide slope angle to a predetermined value.

The instructions may be configured to cause the one or more data processors to determine that the glide slope angle is indicative of the steep approach if the glide slope angle is greater than about 4.5 degrees.

The instructions may be configured to cause the one or more data processors to retrieve the glide slope angle from the navigation database.

The request to arm the steep approach function may be configured to instruct a flight control computer of the aircraft to conduct one or more aircraft system checks to make sure that the aircraft is technically capable of performing the steep approach.

Embodiments may include combinations of the above features.

In another aspect, the disclosure describes a system for initiating arming of a steep approach function of an aircraft. The system comprises:
one or more data processors; and
non-transitory machine-readable memory storing instructions executable by the one or more data processors and configured to cause the one or more data processors to automatically generate an output to initiate arming of the steep approach function of the aircraft based on data associated with an approach procedure to be performed by the aircraft being indicative of a steep approach.

The data associated with the approach procedure to be performed by the aircraft may comprise a glide slope angle.

The instructions may be configured to cause the one or more data processors to determine whether the glide slope angle is indicative of the steep approach by comparing the glide slope angle to a predetermined value.

The instructions may be configured to cause the one or more data processors to determine that the glide slope angle is indicative of the steep approach if the glide slope angle is greater than about 4.5 degrees.

The system may comprise a navigation database including the data associated with the approach procedure to be performed by the aircraft.

The output may be configured to cause a flight control computer to arm the steep approach function.

Embodiments may include combinations of the above features.

In another aspect, the disclosure describes a system for automatically arming a steep approach function of an aircraft. The system may comprise:
a flight management system comprising:
one or more data processors; and
non-transitory machine-readable memory storing data associated with an approach procedure to be performed by the aircraft, and, instructions executable by the one or more data processors and configured to cause the one or more data processors to: conditioned upon the data associated with the approach procedure to be performed by the aircraft being indicative of a steep approach, automatically generate a request to arm a steep approach function of the aircraft; and
a flight control computer operatively coupled to the flight management system and configured to receive the request from the flight management system and arm the steep approach function of the aircraft.

The data associated with the approach procedure to be performed by the aircraft may comprise a glide slope angle.

The instructions may be configured to cause the one or more data processors to determine whether the glide slope angle is indicative of the steep approach by comparing the glide slope angle to a predetermined value.

The flight control computer may be configured to conduct one or more aircraft system checks to make sure that the aircraft is technically capable of performing the steep approach.

The flight control computer may be configured to cause an indication that steep approach function of the aircraft is armed, to be provided.

Embodiments may include combinations of the above features.

In another aspect, the disclosure describes a computer-implemented method for automatically initiating arming of a steep approach function of an aircraft. The method comprises:

receiving data associated with an approach procedure to be performed by the aircraft; and conditioned upon the data being indicative of a steep approach, automatically initiating arming of the steep approach function of the aircraft.

The data associated with the approach procedure to be performed by the aircraft may comprise a glide slope angle.

The method may comprise determining whether the glide slope angle is indicative of the steep approach by comparing the glide slope angle to a predetermined value.

The method may comprise determining that the glide slope angle is indicative of the steep approach if the glide slope angle is greater than about 4.5 degrees.

The method may comprise retrieving the glide slope angle from a navigation database.

Initiating arming of the steep approach function may comprise instructing a flight control computer to arm the steep approach function.

The method may comprise using a flight management system of the aircraft to automatically initiate arming of the steep approach function.

Embodiments may include combinations of the above features.

In a further aspect, the disclosure describes an aircraft comprising a system as disclosed herein.

Further details of these and other aspects of the subject matter of this application will be apparent from the drawings and detailed description included below.

DESCRIPTION OF THE DRAWINGS

Reference is now made to the accompanying drawings, in which.

DETAILED DESCRIPTION

The present disclosure relates to systems and related methods for alleviating the workload of aircraft pilots. In various embodiments, the systems and methods disclosed herein are configured to automatically arm a steep approach function based on the value of a glide slope angle or other data associated with a selected approach procedure to be performed by an aircraft in the active flight. In some embodiments, the automatic arming of the steep approach function can alleviate pilot workload and improve safety of operation of an aircraft. For example, the automatic arming of the steep approach function can ensure that the steep approach function is armed when it is required and/or can prevent the inadvertent arming of the steep approach function by the pilot when it is not required.

Aspects of various embodiments are described through reference to the drawings.

Figure 1:
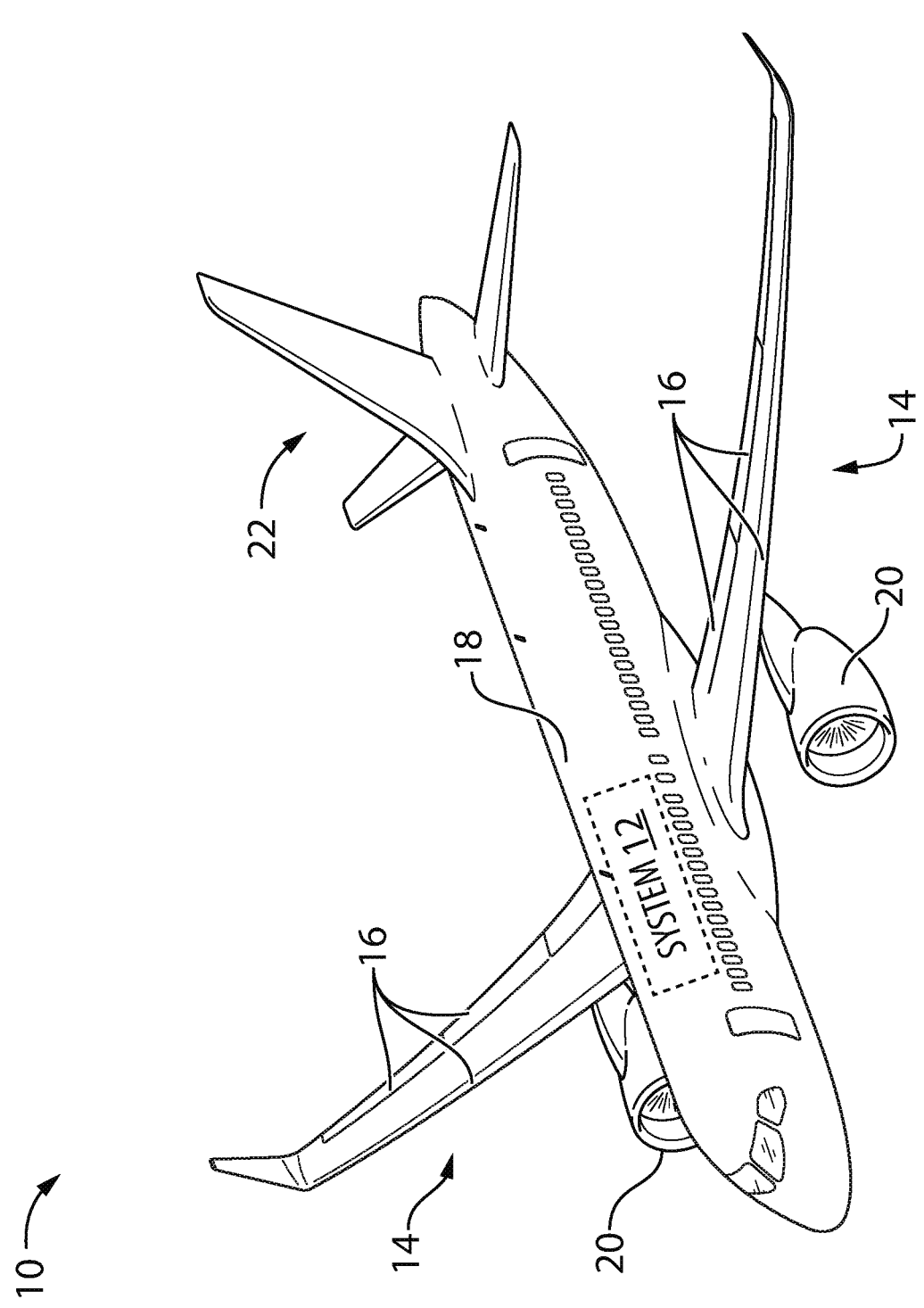
FIG. 1 is a perspective view of an exemplary aircraft comprising a system for automatically arming a steep approach function as disclosed herein.

FIG. 1 is a perspective view of an exemplary aircraft 10 which may comprise system 12 (shown schematically) for automatically arming a steep approach function of aircraft 10. Aircraft 10 may be any type of aircraft such as corporate (e.g., business jet), private, commercial and passenger aircraft. For example, aircraft 10 may be a narrow-body, twin-engine jet airliner. Aircraft 10 may be a fixed-wing aircraft. Aircraft 10 may comprise one or more wings 14 including one or more flight control surfaces 16, fuselage 18, one or more engines 20 and empennage 22 of suitable type. One or more of engines 20 may be mounted to one or more of wings 12. Alternatively, or in addition, one or more of engines 20 may be mounted to fuselage 18 or be installed on aircraft 10 in any suitable manner.

As used herein, the term "pilot" is intended to encompass one or more individuals responsible for the operation of aircraft 10 during flight. Such individuals may, for example, include the pilot (sometimes referred as "captain") and/or the co-pilot (sometimes referred as "first officer"). It is understood that a pilot of aircraft 10 may comprise an individual that is onboard of aircraft 10 during operation (e.g., flight) of aircraft 10 or may comprise an individual (e.g., operator) located remotely from aircraft 10 (e.g., at a ground station) and remotely controlling at least some aspect of operation of aircraft 10. It is understood that system 12 or part(s) thereof may be located onboard aircraft 10 and/or remotely from aircraft 10. Similarly, it is understood that the methods disclosed herein or part(s) thereof could be conducted onboard aircraft 10 and/or remotely from aircraft 10. For example, it is understood that relevant information could be transmitted to/from aircraft 10 in order to achieve automatic arming of the steep approach function of aircraft 10 at least partially remotely (e.g., from a ground station).

Figure 2:
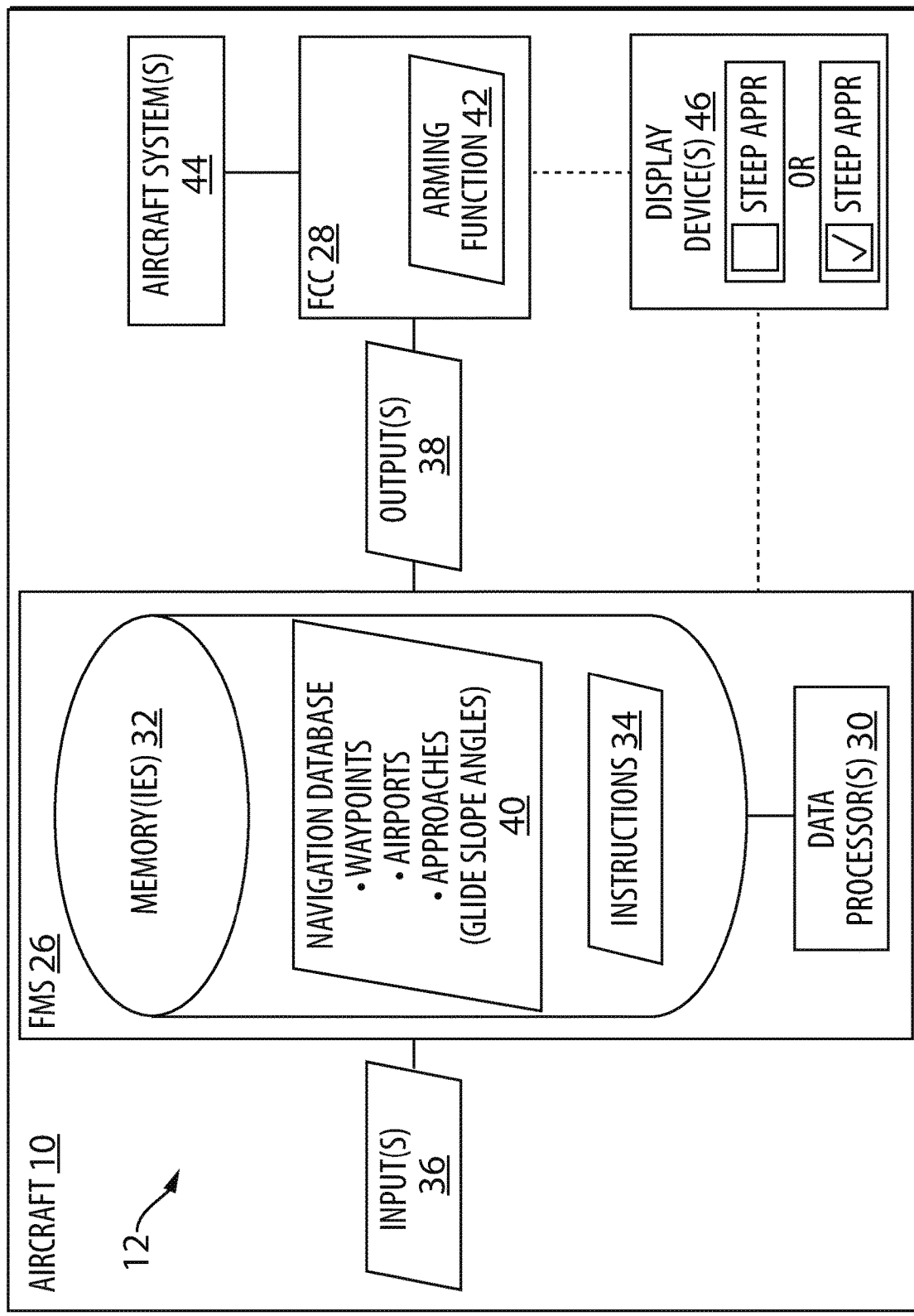
FIG. 2 is a schematic illustration of the aircraft of FIG. 1 and the system for automatically arming the steep approach function.

FIG. 2 is a schematic illustration of aircraft 10 and arming system 12 for automatically arming the steep approach function of aircraft 10. In some embodiments, arming system 12 may be disposed onboard of aircraft 10 and may comprise one or more computers configured to perform the methods disclosed herein. In various embodiments, the automatic arming of the steep approach function may be performed entirely using a single computer or cooperatively using a plurality of computers. The term "automatic" as used herein in the context of arming the steep approach function is intended to encompass the capability of such action being carried out independently of the pilot's influence or control. Accordingly, some components of arming system 12 may be configured to carry out one or more actions automatically so as to alleviate pilot workload. The exemplary embodiment of arming system 12 illustrated in FIG. 2 is intended to represent a non-limiting example and it is understood that aspects of this disclosure could be implemented on a system having a different architecture.

Arming system 12 may comprise one or more computers. For example arming system 12 may comprise flight management system 26 (referred hereinafter as "FMS 26") and flight control computer 28 (referred hereinafter as "FCC 28") operatively coupled thereto. EMS 26 and FCC 28 may be part of an avionics suite of aircraft 10. For example, in some embodiments, FMS 26 and FCC 28 may carry out additional functions than those described herein. FMS 26 may comprise a specialized computer system that carries out in-flight tasks including in-flight management of the flight plan. FMS 26 may assist in guiding aircraft 10 along the flight plan. FMS 26 may be controlled through a control display unit (CDU) located in a cockpit of aircraft 10 or, for example, at a ground station for a remotely-controlled aircraft 10. FCC 28 may be a primary flight control computer (PFCC) of aircraft 10. In some embodiments, FCC 28 may be part of a fly-by-wire control system of suitable type.

FMS 26 may comprise one or more data processors 30 (referred hereinafter in the singular) of suitable type and which may be used to perform methods disclosed herein in entirety or in part. In some embodiments, methods disclosed herein may be performed using a single data processor 30 or, alternatively, part(s) of the methods disclosed herein could be performed using multiple data processors 30. FMS 26 may comprise machine-readable memory 32 storing instructions 34 executable by data processor 30 and configured to cause data processor 30 to carry out one or more tasks associated with automatically arming a steep approach function of aircraft 10. For example, FMS 26 may receive input(s) 36 in the form of data or information that may be processed by data processor 30 based on instructions 34 in order to generate output(s) 38. For example, input 36 may comprise information (data) representative of an approach procedure selected by a pilot and that is to be performed by aircraft 10. For example, an approach procedure may comprise an Instrument Approach Procedure (IAP) of suitable type and may comprise a series of predetermined maneuvers for the orderly transfer of aircraft 10 under instrument flight conditions from the beginning of the initial approach to a landing, or to a point from which a landing may be made visually, as defined in Section 170.3, Title 14 of the Code of Federal Regulations (14 CFR 170.3). The approach procedure may be prescribed and approved for a specific destination airport for aircraft 10 by competent authority.

Input 36 may be received via one or more input devices of suitable types. Alternatively, input 36 could be produced/derived within FMS 26 and subsequently used by data processor 30. For example, in some embodiments, the approach procedure may be selected by the pilot or may be automatically selected by FMS 26 based on the location of aircraft 10 as determined by global positioning system (GPS) for example or based on other factors, such as based on the flight plan, an airport at which the aircraft 10 is intended to land, or a runway on which the aircraft 10 is intended to land.

Data processor 30 may comprise any suitable device(s) configured to cause a series of steps to be performed by FMS 26 so as to implement a computer-implemented process such that instructions 34, when executed by FMS 26, may cause the functions/acts specified in the methods described herein to be executed. Data processor 30 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 32 may comprise any suitable machine-readable storage medium or media. Memory 32 may comprise non-transitory computer readable storage medium such as, for example, but not limited to, an electronic, magnetic, optical, electromagnetic, infrared, or semiconductor system, apparatus, or device, or any suitable combination of the foregoing. Memory 32 may include a suitable combination of any type of computer memory that is located either internally or externally to FMS 26. Memory 32 may comprise any storage means (e.g. devices) suitable for retrievably storing machine-readable instructions 34 executable by data processor 30.

Various aspects of the present disclosure may be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 32) having computer readable program code (e.g., instructions 34) embodied thereon. The computer program product may, for example, be executed to cause the execution of one or more methods disclosed herein in entirety or in part. Computer program code for carrying out operations for aspects of the present disclosure in accordance with instructions 34 may be written in any combination of one or more programming languages. Such program code may be executed entirely or in part by FMS 26 or other data processing device(s). It is understood that, based on the present disclosure, one skilled in the relevant arts could readily write computer program code for implementing the methods disclosed herein.

FMS 26 may also comprise navigation database 40, which may be stored in memory 32 or some other machine-readable medium. Navigation database 40 may contain elements from which the flight plan is constructed as defined, for example, in the Aeronautical Radio, Incorporated (ARINC) 424 standard. Navigation database 40 may contain the information required for building a flight plan. Such information may include waypoints, airways, radio navigation aids, airports, runways and approach procedures (including associated glide slope angles).

Based on data (e.g., glide slope angle) associated with an approach procedure to be performed by aircraft 10 (e.g., available in navigation database 40) in the active flight, instructions 34 may be configured to cause data processor 30 to: conditioned upon data associated with the approach procedure to be performed by aircraft 10 being indicative of a steep approach, automatically generate a request (e.g., output 38) to instruct FCC to arm the steep approach function of aircraft 10. For example, output 38 may be in the form of one or more signals transmitted to FCC 28 and configured to cause FCC 28 to initiate arming function 42 stored as machine-readable instructions within FCC 28 or otherwise accessible to FCC 28. FCC 28 may be operatively coupled to one or more aircraft systems 44 so that FCC 28 may have the capability to verify the state(s) of aircraft systems 44.

Arming function 42 may comprise instructions executable by FCC 28 in order to arm the steep approach function of aircraft 10. In order to safely carry out a steep approach, aircraft 10 must have the technical ability to implement the steep approach. Aircraft 10 must be equipped with the required equipment and the operational state of such equipment must meet certain criteria. For example, in order to carry out a steep approach, certain engine thrust settings and operation of flight control surfaces 16 (e.g., spoilers, flaps) may be required to follow the steeper glide slope angle. Similarly, some flight parameters (e.g., altitude) may need to be monitored within a relatively high degree of precision during a steep approach. The act of arming the steep approach function of aircraft 10 may comprise conducting one or more checks on systems 44 to make sure that aircraft 10 is technically capable of safely carrying out a steep approach. In some embodiments, the system checks may be performed by FCC 28 automatically or otherwise.

Once the required system checks have been performed, arming function 42 may be configured to output some indication as to whether or not the steep approach function of aircraft 10 is armed (i.e., ready to be used). Such indication may be provided to the pilot via one or more display devices 46 (referred hereinafter in the singular), which may be located in the cockpit of aircraft 10. Display device 46 may be operatively coupled to FMS 26 and/or to FCC 28. If, during or at the conclusion of arming function 42, FCC 28 determines that the operational state(s) of aircraft system(s) 44 do not meet the required criteria, an indication indicating that the steep approach function is not armed may be provided. Such exemplary indication is illustrated on display device 46 of FIG. 2 by the exemplary label "STEEP APPR" with the adjacent box being unchecked. If however, at the conclusion of arming function 42, FCC 28 determines that the operational state(s) of aircraft system(s) 44 do meet the required criteria, an indication indicating that the steep approach function is armed may be provided. Such exemplary indication is illustrated on display device 46 of FIG. 2 by the exemplary label "STEEP APPR" with the adjacent box being checked.

Arming function 42 may be configured to cause FCC 28 to determine that the steep approach function of aircraft 10 is armed if a predetermined number of condition(s) are met. Non-limiting examples of such conditions are listed below:
 (a) a steep approach request from FMS 26 is TRUE;
 (b) FCC 28 is in a (e.g., normal) mode of operation suitable for supporting a steep approach;
 (c) all flight control surface actuators are engaged;
 (d) the selected high lift handle position is valid;
 (e) the selected radio altitude is valid;
 (f) the selected radio altitude is greater than 1,000 feet;
 (g) the selected inertial vertical speed is valid;
 (h) the selected landing gear lever position is valid;
 (i) the selected left and right throttle lever angle (TLA) positions are valid;
 (j) the autoland function is not engaged;
 (k) the failure ice logic is not asserted;
 (l) the high lift fail logic is not asserted;
 (m) both the left and right engines are running; and
 (n) the engine control system can support a steep approach.

The initial determination of whether the steep approach function of aircraft 10 should be armed may be made by FMS 26. For example, FMS 26 may receive input 36 from the pilot or from another source where input 36 may be indicative of a selected approach procedure to be carried out by aircraft 10. Such input 36 may be received at any time prior to such steep approach function needing to be carried out. For example, such input 36 may be received during flight planning either during flight of aircraft 10 or before take-off of aircraft 10. Based on input 36 indicative of the selected approach procedure to be carried out, instructions 34 may be configured to cause FMS 26 to retrieve (e.g., look-up) the data representative of the glide slope angle associated with the selected approach procedure from navigation database 40. Therefore, the glide slope angle may be retrieved from navigation database 40 based on the selected approach procedure.

Instructions 34 may be configured to, using the value of the glide slope angle, cause data processor 34 to determine whether the glide slope angle is indicative of a steep approach by comparing the glide slope angle to a predetermined value or range of values. For example, in some embodiments, FMS 26 may verify whether the value of the glide slope angle associated with the selected approach procedure is greater than a classic approach angle (e.g., greater than 3 degrees) in order to determine whether or not to initiate automatic arming of the steep approach function. In some embodiments, FMS 26 may verify whether the value of the glide slope angle associated with the selected approach procedure is equal to or greater than about 4.5 degrees. In some embodiments, FMS 26 may, for example, verify whether the value of the glide slope angle associated with the selected approach procedure is between about 4.5 degrees and about 5.5 degrees. The specific value or range of values may depend on the capabilities of aircraft 10. In various situations, glide slope angles between about 4.5 degrees and about 7 degrees may be considered steep approaches for some fixed-wing aircraft.

In some embodiments, the data associated with the selected approach procedure in navigation database 40 may contain some other data field that is indicative of a steep approach so that the glide slope angle may not necessarily be evaluated to determine that the selected approach procedure is a steep approach. For example, a binary data field indicative of the approach procedure to be performed as being either steep or not steep (e.g., classic) may be used to initiate arming instead of comparing a glide slope angle against a predetermined value (e.g., threshold). Also, the determination of whether or not the selected approach procedure is a steep approach may be made based on an airport selection or a runway selection where a steep approach procedure would be associated with such airport or runway selection.

If, in any suitable manner, FMS 26 determines that the selected approach procedure corresponds to a steep approach, then FMS 26 may generate output 38 to initiate arming of the steep approach function of aircraft 10. As explained above, this determination may be based on the value of glide slope angle. Such determination and generation of output 38 by FMS 26 may be made at any suitable time prior to the performance of the steep approach by aircraft 10. Such determination and generation of output 38 may be done during any phase of operation (e.g., flight) of aircraft 10 prior to the approach phase. For example, in some embodiments, such determination and generation of output 38 may be done prior to take-off. In various embodiments, such determination and generation of output 38 may be carried out automatically by FMS 26 based on the selected approach procedure so that once the approach procedure has been selected by the pilot or otherwise, the arming of the steep approach function may be automatically initiated, if necessary, without the pilot's involvement or control. As explained above, output 38 generated by FMS 26 may be in the form of an indication (e.g., request) for FCC 28 to execute arming function 42. For example, output 38 may be indicative of a steep approach status or request being "TRUE". Accordingly, in some embodiments, the automatic arming of the steep approach function may ensure that the steep approach function is armed when it is required.

Alternatively, if FMS 26 does not determine that the selected approach procedure is indicative of a steep approach, then output 38, configured to automatically initiate the arming of the steep approach function may not be generated. For example, if the glide slope angle associated with the selected approach procedure is not indicative of a steep approach, output 38 may be indicative of a steep approach status or request being "FALSE". Accordingly, in some embodiments, the automatic arming of the steep approach function may prevent the inadvertent arming of the steep approach function when it is not required.

Figure 3:
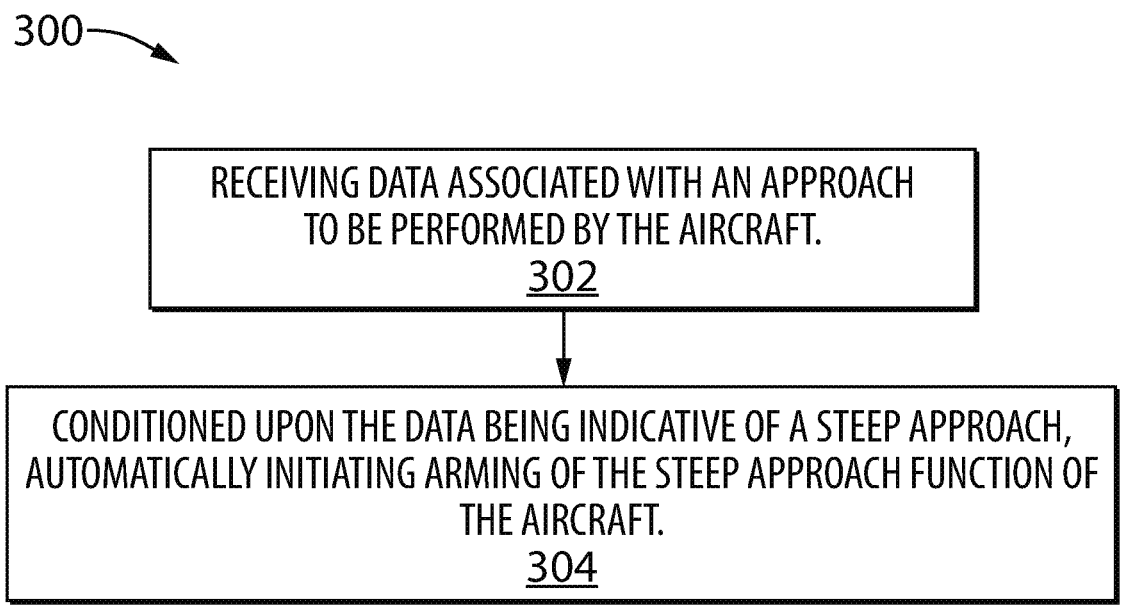
FIG. 3 is a flowchart illustrating a method for automatically initiating arming of the steep approach function.

FIG. 3 is a flowchart illustrating a method 300 for automatically initiating arming (and optionally also arming) the steep approach function of aircraft 10. Method 300 may be capable of being performed entirely or in part using arming system 12 and aspects of arming system 12 disclosed above in relation to arming system 12 may also apply to method 300. In various embodiments, method 300 may be computer-implemented (e.g., via FMS 26) and may comprise: receiving data (e.g., glide slope angle) associated with an approach procedure to be performed by aircraft 10 in the active flight (see block 302); and conditioned upon the data being indicative of a steep approach, automatically initiating arming (e.g., via output 38) of the steep approach function of aircraft 10 (see block 304).

As explained above, the data may comprise a glide slope angle associated with the approach procedure to be performed by aircraft 10. In some embodiments, method 300 may comprise determining whether the glide slope angle is indicative of the steep approach by comparing the glide slope angle to a predetermined value. In some embodiments, a glide slope angle that is equal to or greater than about 4.5 degrees may be indicative of a steep approach.

In some embodiments, method 300 may comprise receiving data representative of the selected approach procedure (e.g., via input 36) to be performed by aircraft 10; and retrieving the glide slope angle from navigation database 40 based on the selected approach procedure.

In some embodiments of method 300, initiating arming of the steep approach function may comprise instructing FCC 28 to arm the steep approach function (e.g., via arming function 42). In some embodiments of method 300, the automatic initiation of the arming of the steep approach function may be performed using FMS 26.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure.

The present disclosure may be embodied in other specific forms without departing from the subject matter of the claims. Also, one skilled in the relevant arts will appreciate that while the aircraft, systems, computers and methods disclosed and shown herein may comprise a specific number of elements/components, the aircraft, systems, computers and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A flight management system for an aircraft, the flight management system comprising:
   one or more data processors; and
   non-transitory machine-readable memory storing a navigation database including elements from which a flight plan is constructed, the elements including data associated with an approach procedure to be performed by the aircraft, and, instructions executable by the one or more data processors and configured to cause the one or more data processors to:
      conditioned upon the data associated with the approach procedure to be performed by the aircraft being indicative of a steep approach, automatically generate a request to arm a steep approach function of the aircraft.

2. The system as defined in claim 1, wherein the data associated with the approach procedure to be performed by the aircraft comprises a glide slope angle.

3. The system as defined in claim 2, wherein the instructions are configured to cause the one or more data processors to determine whether the glide slope angle is indicative of the steep approach by comparing the glide slope angle to a predetermined value.

4. The system as defined in claim 2, wherein the instructions are configured to cause the one or more data processors to determine that the glide slope angle is indicative of the steep approach if the glide slope angle is greater than about 4.5 degrees.

5. The system as defined in claim 2, wherein the instructions are configured to cause the one or more data processors to retrieve the glide slope angle from the navigation database.

6. The system as defined in claim 1, wherein the request to arm the steep approach function is configured to instruct a flight control computer of the aircraft to conduct one or more aircraft system checks to make sure that the aircraft is technically capable of performing the steep approach.

7. An aircraft comprising the system as defined in claim 1.

8. A system for initiating arming of a steep approach function of an aircraft, the system comprising:
   a navigation database including elements from which a flight plan is constructed, the elements including data associated with an approach procedure to be performed by the aircraft;
   one or more data processors; and
   non-transitory machine-readable memory storing instructions executable by the one or more data processors and configured to cause the one or more data processors to automatically generate an output to initiate arming of the steep approach function of the aircraft based on the data associated with the approach procedure to be performed by the aircraft being indicative of a steep approach.

9. The system as defined in claim 8, wherein the data associated with the approach procedure to be performed by the aircraft comprises a glide slope angle.

10. The system as defined in claim 9, wherein the instructions are configured to cause the one or more data processors to determine whether the glide slope angle is indicative of the steep approach by comparing the glide slope angle to a predetermined value.

11. The system as defined in claim 9, wherein the instructions are configured to cause the one or more data processors to determine that the glide slope angle is indicative of the steep approach if the glide slope angle is greater than about 4.5 degrees.

12. The system as defined in claim 8, wherein the output is configured to cause a flight control computer to arm the steep approach function.

13. A system for automatically arming a steep approach function of an aircraft, the system comprising:
   a flight management system comprising:
      one or more data processors; and
      non-transitory machine-readable memory storing a navigation database including elements from which a flight plan is constructed, the elements including data associated with an approach procedure to be performed by the aircraft, and, instructions executable by the one or more data processors and configured to cause the one or more data processors to:

conditioned upon the data associated with the approach procedure to be performed by the aircraft being indicative of a steep approach, automatically generate a request to arm a steep approach function of the aircraft; and a flight control computer operatively coupled to the flight management system and configured to receive the request from the flight management system and arm the steep approach function of the aircraft.

14. The system as defined in claim 13, wherein the data associated with the approach procedure to be performed by the aircraft comprises a glide slope angle.

15. The system as defined in claim 14, wherein the instructions are configured to cause the one or more data processors to determine whether the glide slope angle is indicative of the steep approach by comparing the glide slope angle to a predetermined value.

16. The system as defined in claim 13, wherein the flight control computer is configured to cause an indication that steep approach function of the aircraft is armed, to be provided.

17. The system as defined in claim 13, wherein the flight control computer is configured to conduct one or more aircraft system checks to make sure that the aircraft is technically capable of performing the steep approach.

18. A computer-implemented method for automatically initiating arming of a steep approach function of an aircraft, the method comprising:

providing non-transitory machine-readable memory storing a navigation database including elements from which a flight plan is constructed, the elements including data associated with an approach procedure to be performed by the aircraft;

receiving, from the navigation database, the data associated with the approach procedure to be performed by the aircraft; and conditioned upon the data being indicative of a steep approach, automatically initiating arming of the steep approach function of the aircraft.

19. The method as defined in claim 18, wherein the data associated with the approach procedure to be performed by the aircraft comprises a glide slope angle.

20. The method as defined in claim 19, comprising determining whether the glide slope angle is indicative of the steep approach by comparing the glide slope angle to a predetermined value.

21. The method as defined in claim 20, comprising determining that the glide slope angle is indicative of the steep approach if the glide slope angle is greater than about 4.5 degrees.

22. The method as defined in claim 18, wherein initiating arming of the steep approach function comprises instructing a flight control computer to arm the steep approach function.

23. The method as defined in claim 18, comprising using a flight management system of the aircraft to automatically initiate arming of the steep approach function.

\* \* \* \* \*